(12) United States Patent
Kinoshita et al.

(10) Patent No.: US 6,206,559 B1
(45) Date of Patent: Mar. 27, 2001

(54) PLASTICATING SCREW

(75) Inventors: Kiyoshi Kinoshita; Tetuo Uwazi; Toshihiko Kariya, all of Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/142,056

(22) PCT Filed: Feb. 10, 1998

(86) PCT No.: PCT/JP98/00547

§ 371 Date: Sep. 17, 1998

§ 102(e) Date: Sep. 17, 1998

(87) PCT Pub. No.: WO98/35813

PCT Pub. Date: Aug. 20, 1998

(30) Foreign Application Priority Data

Feb. 17, 1997 (JP) ...................................................... 9-032464

(51) Int. Cl.[7] .................................................. B29B 7/42
(52) U.S. Cl. ................................................. 366/79; 366/81
(58) Field of Search ................................. 366/81, 88, 89, 366/90, 97, 98, 99, 79, 80, 87, 82; 425/587, 204, 207, 208

(56) References Cited

U.S. PATENT DOCUMENTS

| 3,486,192 | * | 12/1969 | Roy | 366/82 |
| 3,756,574 | * | 9/1973 | Maddock | 366/82 |
| 4,169,679 | * | 10/1979 | Miller et al. | 366/81 |
| 4,329,313 | * | 5/1982 | Miller et al. | 366/88 |
| 4,425,044 | * | 1/1984 | Kurtz et al. | 366/79 |

FOREIGN PATENT DOCUMENTS

| 35 33 225 | * | 5/1986 | (DE) | 366/79 |
| 0078453 | * | 11/1983 | (EP) | 366/79 |
| 43-24493 | | 10/1968 | (JP) | . |
| 56-42035 | | 10/1981 | (JP) | . |
| 59-67028 | * | 4/1984 | (JP) | 366/79 |
| 59-73931 | * | 4/1984 | (JP) | 366/79 |
| 59-103732 | * | 6/1984 | (JP) | 366/79 |
| 61-86215 | * | 5/1986 | (JP) | 366/79 |
| 63-32603 | | 6/1988 | (JP) | . |
| 63-56048 | | 11/1988 | (JP) | 366/79 |
| 4-77611 | | 12/1992 | (JP) | . |
| 6-84035 | | 10/1994 | (JP) | . |
| 7-39619 | | 9/1995 | (JP) | . |
| 7-276462 | | 10/1995 | (JP) | . |

* cited by examiner

Primary Examiner—Tony G. Soohoo
(74) Attorney, Agent, or Firm—Armstrong, Westerman, Hattori, McLeland & Naughton

(57) ABSTRACT

This invention relates to a plasticating screw suitable for use in an injection molding machine or an extruder. In the plasticating screw which is rotatable within a cylinder and has a mixing head (7) with plural groove portions (7a,7b) formed therein, recesses (2,3) in the shape of steps or slopes are formed on an outer peripheral surface (7d) of the mixing head (7) other than the groove portions (7a,7b) so that the recesses are in communication with the groove portions (7a,7b) located forward thereof as viewed in a direction of rotation.

18 Claims, 10 Drawing Sheets

FIG. IA
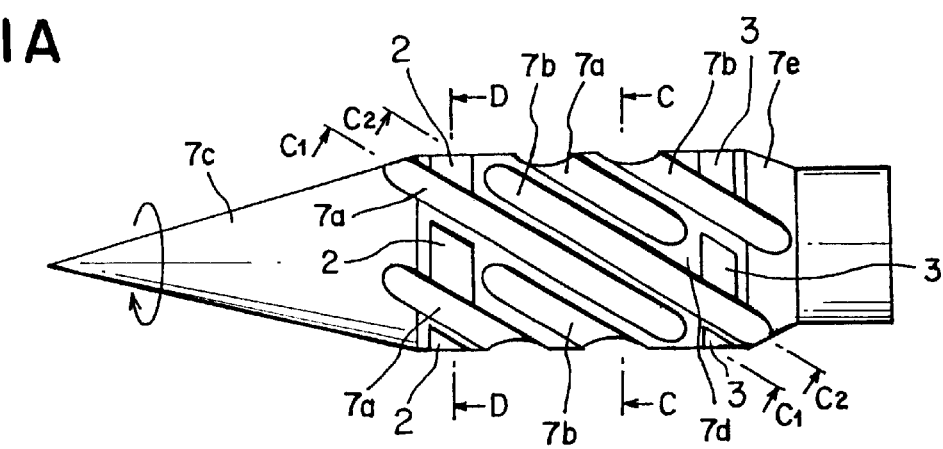
FIG. IB
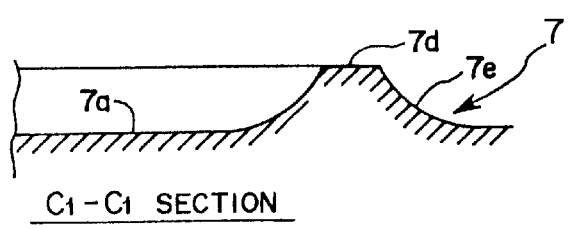
C1-C1 SECTION
FIG. IC
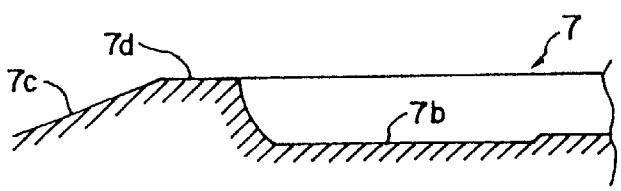
C2-C2 SECTION

C-C SECTION

D-D SECTION

ENLARGMENT OF PORTION E

ENLARGEMENT OF PORTION E

A1 – A1 SECTION

A2 – A2 SECTION

A-A SECTION

B-B SECTION

B-B SECTION

BARRIER END SECTION — BARRIER SECTION — BARRIER START SECTION

PLASTICATING SCREW

TECHNICAL FIELD

This invention relates to a plasticating screw suitable for use in an injection molding machine or extruder which is adapted to inject a resin material such as plastics into a mold or to extrude the same sub-sequent to plastication.

BACKGROUND ART

Injection molding machines and extruders, which perform injection molding or extrusion of a solid feed (resin material) subsequent to melting and plastication, are widely known for many years. Such injection molding machines and extruders are provided with screws for melting and kneading a resin material, and rotation of the screws promotes melting and mixing of the melted and plasticated resin material.

As an illustrative example of techniques relating to such screws, there is the technique disclosed in JP kokoku 43-24493. According to this technique, as is illustrated in FIG. 7, a mixing head 107 is arranged on a free end of a screw 101, and a narrow clearance is formed between a cylinder 103 and the mixing head 107.

Further, as is shown in FIG. 8A, plural grooves 107a,107b are helically formed on an outer peripheral wall 107d of the mixing head 107, and are alternately arranged so that they do not communicate with each other. FIG. 9 is an A—A section of FIG. 8A and, as is depicted in FIG. 9, the grooves 107a and grooves 107b are alternately formed at equal intervals in an approximately central part of the mixing head 107.

A description will now be made about these grooves 107a,107b with reference to FIG. 8B and FIG. 8C. Incidentally, FIG. 8B and FIG. 8C are $A_1$—$A_1$ section and $A_2$—$A_2$ section of FIG. 8A, respectively.

As is shown in FIG. 8A, an end of each groove 107a extends to a tapered portion 107c on a side of a forward end of the mixing head 107 (on a left side as viewed in the drawing), and as is illustrated in FIG. 8A and FIG. 8B, its opposite end terminates in the outer peripheral wall 107d without reaching a tapered portion 107e on a side of a rearward end of the mixing head 107 (on a right side as viewed in the drawing).

In contrast with the grooves 107a, each groove 107b, as depicted in FIGS. 8A and 8C, terminates at an end thereof in the outer peripheral wall 107d without extending to the tapered portion 107c on the side of the forward end of the mixing head 107. Further, as is shown in FIG. 8A, this groove is formed so that at an opposite end thereof, it extends to the tapered portion 107e on the side of the rearward end of the mixing head 107.

A brief description will next be made about operation of the plasticating screw 101 having the mixing head 107 described above. When an unillustrated feed is supplied from a feed hopper 108 shown in FIG. 7, the cylinder 103 is heated to a predetermined temperature by a heater free of illustration. Rotation of the screw 101 by an unillustrated screw drive unit propels the resin feed from the feed hopper 108 toward a forward end of the cylinder 103. By heat from the heater via the cylinder 103 and shear heating of the feed in the grooves of the screw 101, the resin feed in the cylinder 103 undergoes gradual melting.

In some instances, kneading and dispersion of the resin feed would not be achieved fully if the screw 101 were solely relied upon. Owing to the provision of the above-mentioned mixing head 107, sufficient melting and kneading can be performed. Described specifically, the feed which has entered the grooves 107b from the tapered portion 107e on the side of the rearward end of the mixing head 107 moves into the grooves 107a under rotation of the mixing head 107, and is then propelled from the grooves 107a to the tapered portion 107c on the side of the forward end of the mixing head 107. As a result of the movement of the feed from the grooves 107b into the grooves 107a as described above, the feed is subjected to further shear force and dividing action so that good kneading and dispersion can be achieved. By the way, this mixing head 107 is generally called the "Maddock type" and besides the above-mentioned one, a variety of Maddock mixing heads are known.

In the case of the Maddock mixing head 107 disclosed in JP kokoku 43-24493, etc., the clearance between the mixing head 107 and the cylinder 103 is very small. In the case of a resin feed insufficiently melted by the screw 101 or a resin, such as PVC (polyvinyl chloride), melted considerably at the mixing head 107, the resin pressure may become off-balanced in the direction of a periphery of the mixing head 107, so that a metal-to-metal contact may take place between the mixing head 107 and the cylinder 103, resulting in so-called galling wear.

The mixing head 107 is arranged to improve the melting, kneading and dispersion of a resin feed. Melted conditions may however differ locally in the direction of the periphery of the mixing head 107. Resin pressure which is acting in an angular direction on the mixing head 107 may be off-balanced accordingly.

This results in the occurrence of force so that the mixing head 107 is strongly urged in a radial direction. Therefore an inner wall of the cylinder and the mixing head 107 undergoes a metal-to-metal contact, leading to problems that galling wear may occur on the mixing head 107 and the resin may be deteriorated due to localized over-heating.

To cope with these problems, a technique is disclosed for the prevention of such galling wear, for example, in JP kokoku 6-84035.

According to this technique, a flight 202 of a screw 201 shown in FIG. 10 is provided at a top portion thereof with a tapered land 204' as depicted in FIG. 11 or with a stepped land 204 as illustrated in FIG. 12. Owing to the provision of the land 204 or 204', lubricating pressure is forced to occur by a melted resin material between a cylinder 203 and the screw flight 202, thereby avoiding galling wear between the screw flight 202 and the cylinder 203. Incidentally, FIG. 13 diagrammatically illustrates the state of occurrence of such lubricating pressure.

Further, JP kokoku 4-77611 also discloses a technique which makes it possible to avoid the above-mentioned galling wear. According to this technique, as is illustrated in FIG. 14, a flight is formed broader in a barrier start section or end section of a so-called barrier flight screw or in both of the sections, and this broadened top portion is provided with a tapered (sloped) or stepped recess 301 the radius of which changes from a small radius to a large radius in the direction of rotation of the screw, whereby lubricating pressure is produced by a melted resin to avoid galling wear.

However, if a top portion of a screw flight is provided with such a land only on a main part of a screw like the techniques disclosed in JP kokoku 6-84035 and JP kokoku 4-77611 described above, a mixing head rotates under poorly-balanced load with a small distance left, thereby involving a problem in that galling wear at the mixing head cannot be avoided completely.

The present invention has been completed in view of these problem, and has as an object thereof the provision of a plasticating screw which can avoid a metal-to-metal contact between an inner wall of a cylinder and a mixing head even when resin pressure becomes off-balanced at the mixing head.

DISCLOSURE OF THE INVENTION

To achieve the above object, the present invention provides a plasticating screw rotatable within a cylinder and having a mixing head with plural groove portions formed therein, characterized in that recesses are formed on an outer peripheral surface of the mixing head other than the groove portions so that the recesses are in communication with the groove portions located forward thereof as viewed in a direction of rotation.

Owing to the features as described above, rotation of the plasticating screw forces a feed, which has entered the groove portions, to move onto the outer peripheral surface of the mixing head via the recesses, thereby bringing about a merit that lubricating pressure which is even in an angular direction can be produced between the cylinder and the mixing head. Owing to such lubricating pressure, another merit is brought about in that a metal-to-metal contact (galling wear) between the cylinder and the mixing head can be prevented. This makes it possible to protect the cylinder and the mixing head from damage under diverse operation conditions. Moreover, it is also possible to avoid localized over-heating of a resin under plastication and hence to protect the resin from deterioration.

Preferably, the recesses may be formed in the shape of steps or slopes. When the recesses are formed in such a shape, rotation of the plasticating screw results in a gradual decrease in the clearance between the cylinder and the mixing head in the direction of rotation of the mixing head in the order of each groove portion, its downwardly adjacent recess and the outer peripheral surface. This brings about a merit that lubricating pressure, which is even angularly, can be forced to occur between the cylinder and the mixing head.

The recesses may preferably have a depth set to be 1.5 mm or smaller from the outer peripheral surface of the mixing head. Under any conditions, this feature makes it possible to obtain necessary lubricating pressure and to maintain the mixing head in a good rotating state.

The plasticating screw may be constructed so that the groove portions comprises first groove portions formed in communication with a forward end portion of the mixing head but out of communication with a rearward end portion of the mixing head, and second groove portions formed in communication with the rearward end portion of the mixing head but out of communication with the forward end portion of the mixing head, wherein the first and second groove portions are alternately formed on the mixing head so that the first and second groove portions are out of communication with each other. When constructed so, the plasticating screw, in addition to merits such as those mentioned above, can further promote melting and kneading of a feed.

In addition to the above-mentioned features, the plasticating screw may be constructed so that the recesses comprises first recesses arranged on the forward end portion of the mixing head, and second recesses arranged on the rearward end portion of the mixing head, wherein the first recesses are formed in communication with the first groove portions and the second recesses are formed in communication with the second groove portions. When constructed so, lubricating pressure which is evenly in an angular direction acts at both the forward end portion and rearward end portion of the mixing head, thereby bringing about a merit that prevention of a metal-to-metal contact (galling wear) between the cylinder and the mixing head can be assured.

Further, the groove portions may be formed in communication with both a forward end portion and rearward end portion of the mixing head. This construction also permits full melting and kneading of a feed.

In addition to the above-described features, the recesses may be formed between the groove portions, respectively, and the recesses may be formed in communication with the groove portions located forward thereof as viewed in a direction of rotation. In this case, each recess can be formed sufficiently long in the direction of its length so that, even if it is short in the direction of its width (i.e., in the direction of rotation of the mixing head), a large recess area can be assured. It is therefore unnecessary to set the pitch of the groove portions at a significantly large value, thereby bringing about a merit that a reduction in the kneading performance of a resin material can be minimized.

BRIEF DESCRIPTION OF THE DRAWINGS

FIG. 1A is a schematic view showing an external appearance of a mixing head in a plasticating screw according to a first embodiment of the present invention;

FIG. 1B is a schematic cross-sectional view illustrating the shape of a groove portion on the mixing head in the plasticating screw according to the first embodiment of the present invention, and is a $C_1$—$C_1$ section of FIG. 1A;

FIG. 1C is a schematic cross-sectional view illustrating the shape of another groove portion on the mixing head in the plasticating screw according to the first embodiment of the present invention, and is a $C_2$—$C_2$ section of FIG. 1A;

BEST MODES FOR CARRYING OUT THE INVENTION

Figure 8A:
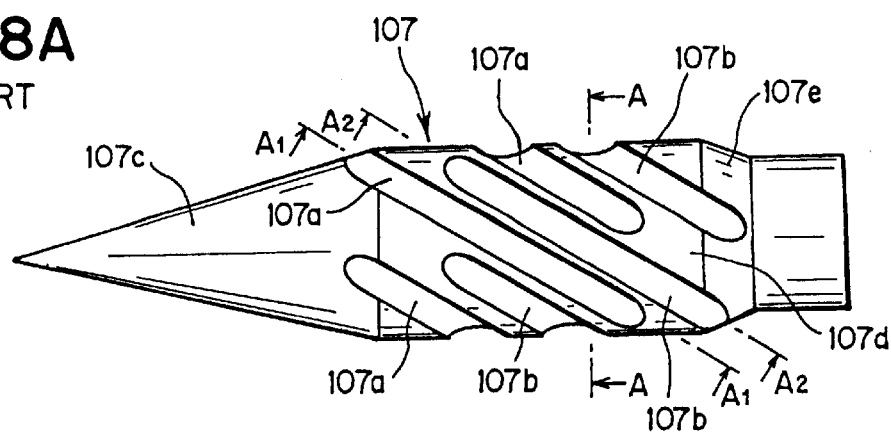
Figure 8B:
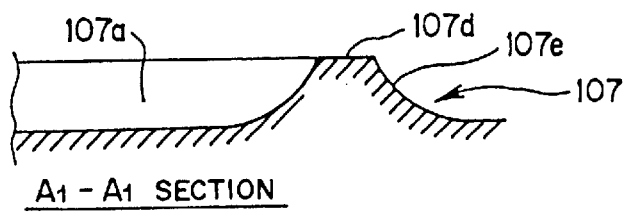
Figure 8C:
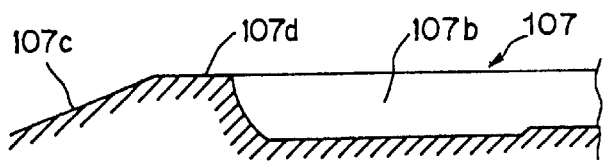
Figure 9:
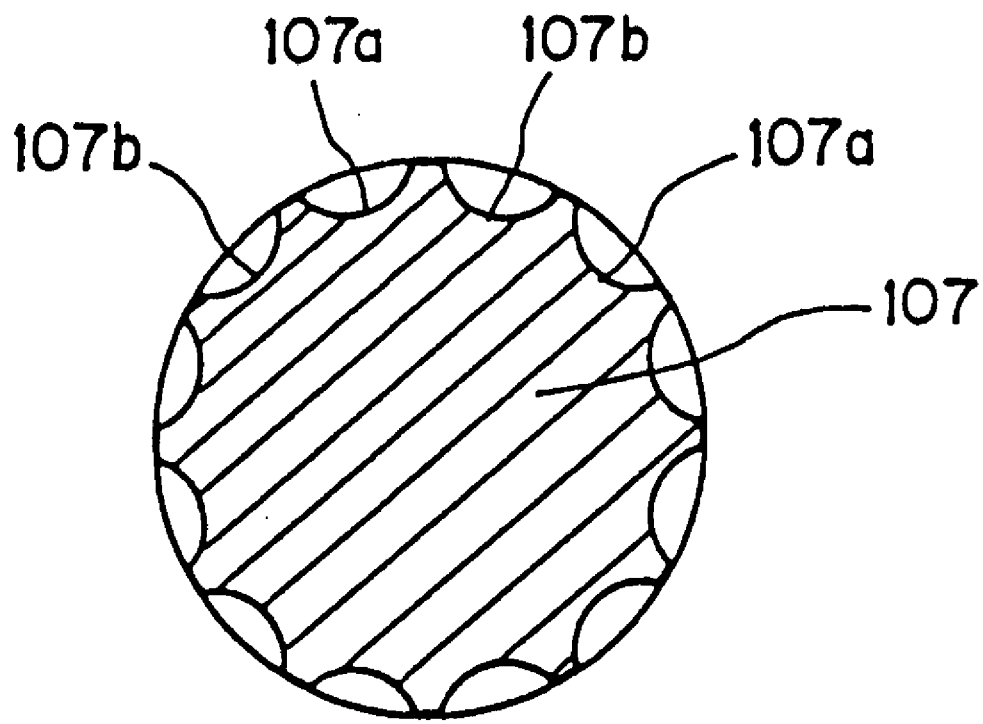
Figure 10:
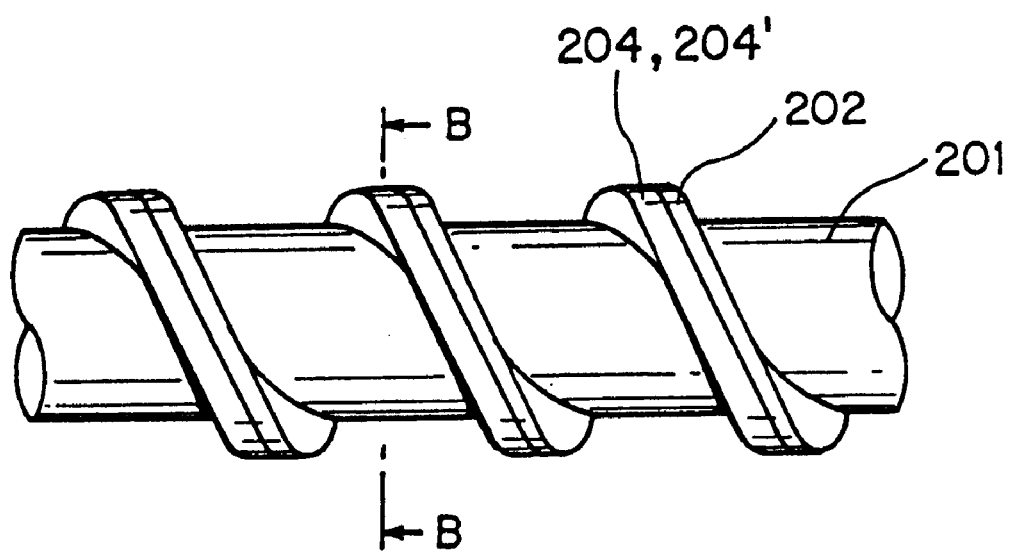
Figure 11:
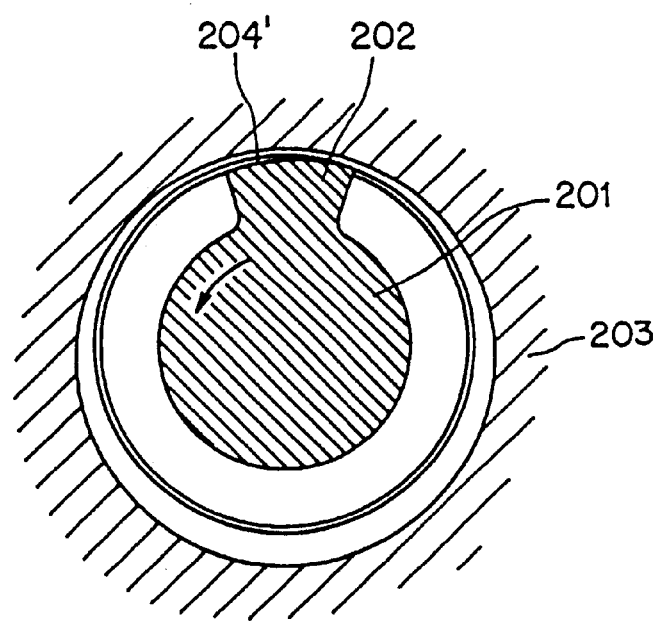
Figure 12:
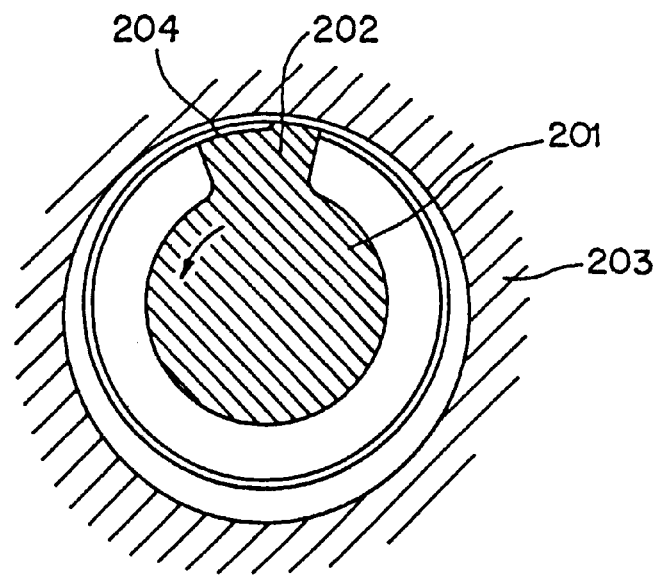
Figure 13:
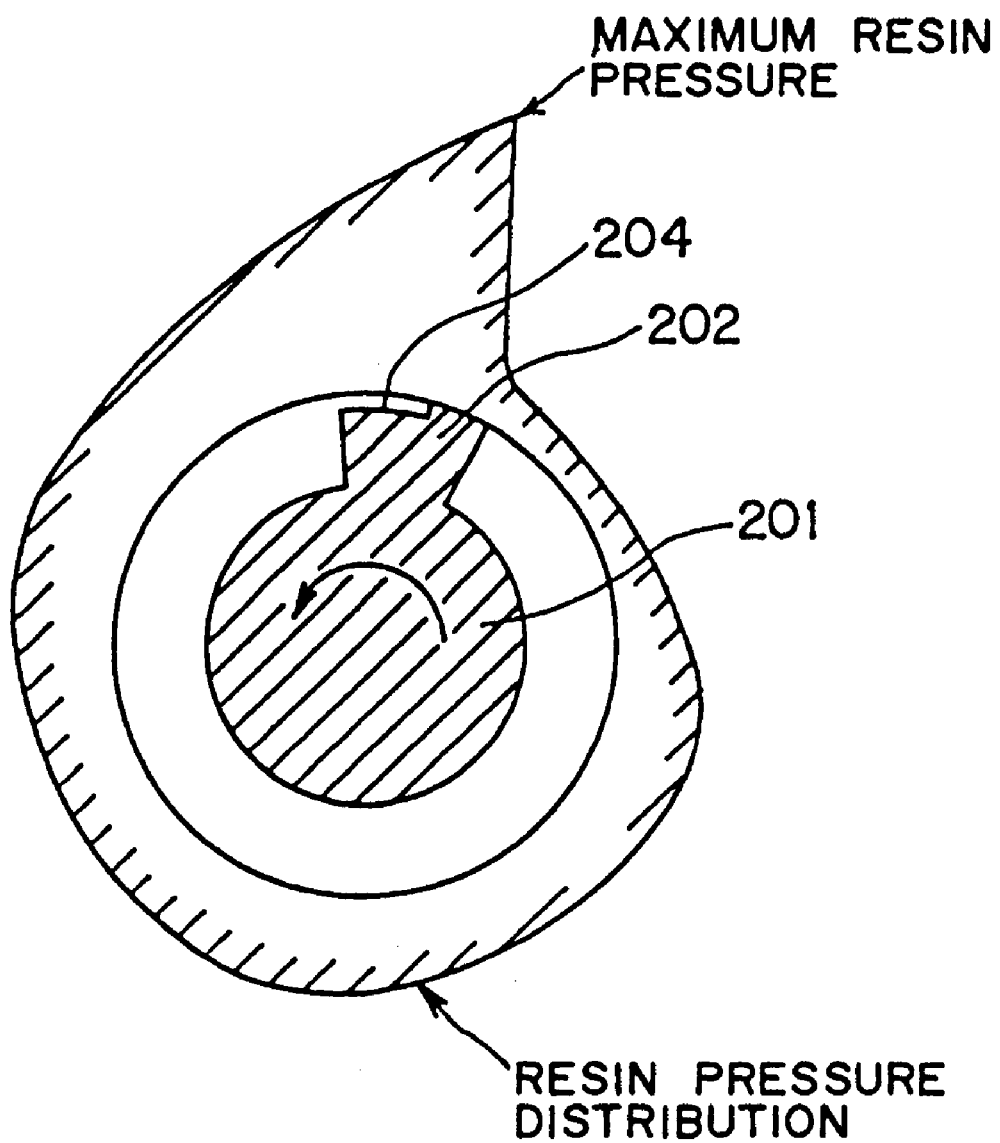
Figure 14:
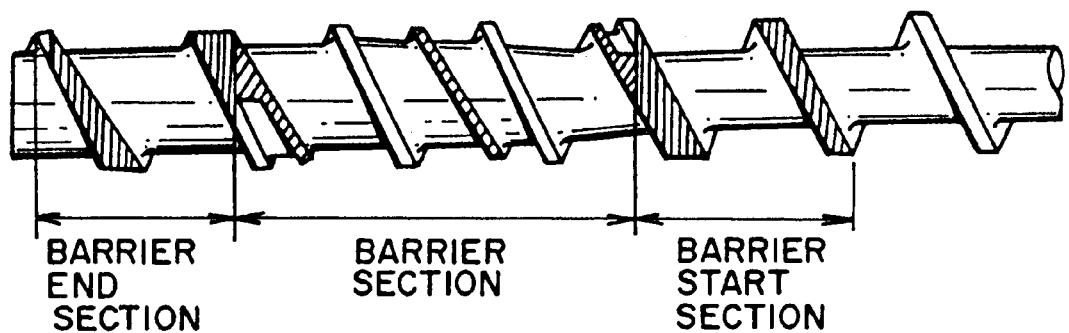

The embodiments of the present invention will hereinafter be described with reference to the drawings.
(a) Description of the First Embodiment
The plasticating screw according to the first embodiment of the present invention will now be described with reference to FIG. 1 to FIG. 5. A mixing head 7 shown in FIGS. 1A to 1C is a Maddock mixing head, has substantially the same construction as the prior art mixing head described with reference to FIGS. 8A to 8C, and is arranged on a forward end of an unillustrated screw.

Namely, as is shown in FIG. 1A, plural grooves (groove portions) 7a,7b are helically formed on an outer peripheral surface 7d of the mixing head 7, and are alternately arranged so that they do not communicate with each other. FIG. 1B and FIG. 1C are the $C_1$—$C_1$ section and $C_2$—$C_2$ section of FIG. 1A, respectively, and are schematic cross-sectional views as viewed in directions perpendicular to center lines (not shown) of the grooves 7a,7b, respectively.

As is shown in FIG. 1A and FIG. 1B, the grooves 7a as the first groove portions are formed so that each of them extends at an end thereof to a tapered portion 7c on a side of a forward end of the mixing head 7 (on a left side as viewed in the drawing) but terminates at an opposite end thereof in the outer peripheral surface 7d without reaching a tapered portion 7e on a side of a rearward end of the mixing head 7 (on a right side as viewed in the drawing).

In contrast to these grooves 7a, the grooves 7b as the second groove portions are formed at one ends thereof so that, as shown in FIG. 1A and FIG. 1C, each of them terminates in the outer peripheral surface 7d without reaching the tapered portion 7c on the side of the forward end of the mixing head 7 but extends at an opposite end thereof to the tapered portion 7e on the side of the rearward end of the mixing head 7.

Figure 2:
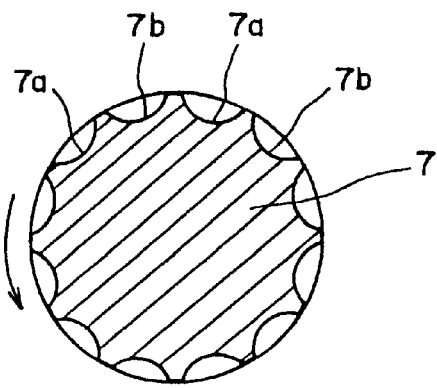
FIG. 2 is a schematic cross-sectional view depicting the shape of the mixing head in the plasticating screw according to the first embodiment of the present invention, and is a C—C section of FIG. 1A.

Incidentally, FIG. 2 is the C—C section of FIG. 1A and, as is illustrated in FIG. 2, the grooves 7a,7b are formed so that the grooves 7a and the grooves 7b are alternately arranged at equal intervals in an approximately central section of the mixing head 7.

A description will next be made about the construction of essential parts of the plasticating screw according to the present invention. As is depicted in FIG. 1A, the mixing head 7 is provided on the side of the forward end thereof with first recesses (herein-after simply called "the recesses") 2 between the grooves 7a,7a, and is also provided on the side of the rearward end thereof with second recesses (hereinafter simply called "the recesses") 3 between the grooves 7b,7b.

Figure 3:
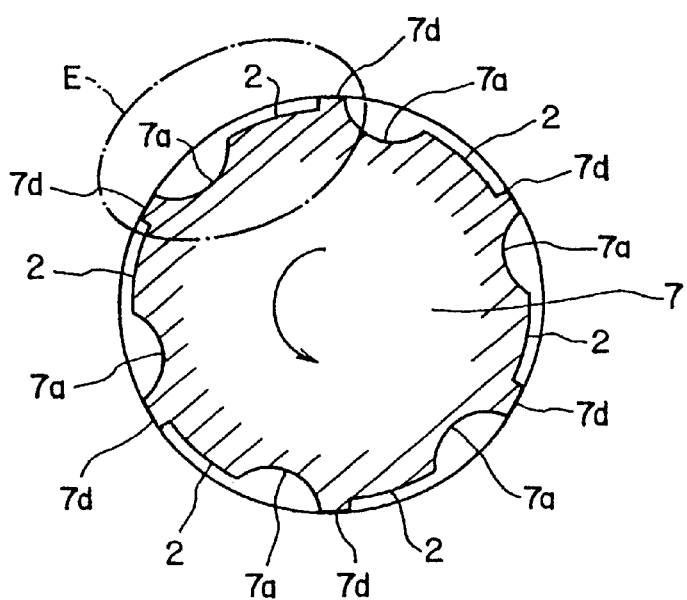
FIG. 3 is a schematic cross-sectional view depicting the shape of the mixing head in the plasticating screw according to the first embodiment of the present invention, and is a D—D section of FIG. 1A.
Figure 4:
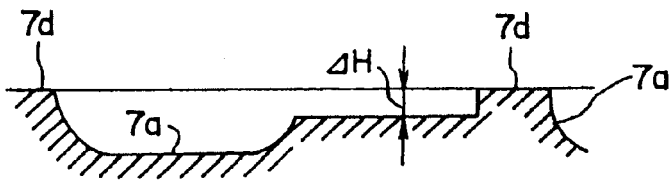
FIG. 4 is a schematic cross-sectional view showing essential features of the plasticating screw according to the first embodiment of the present invention, and is a view showing a portion E of FIG. 3 on an enlarged scale.

These recesses 2,3 are both constructed likewise, so that they will hereinafter be described with a focus placed on the first recesses 2. Here, FIG. 3 is the D—D section of FIG. 1A, and FIG. 4 is the drawing illustrating the portion E of FIG. 3 on the enlarged scale. As is shown in FIG. 3, the recesses 2 are evenly distributed between all the grooves 7a,7a, and are in communication with the forward grooves 7a, respectively, as viewed in the direction of rotation. Further, in rearward parts of the recesses 2 as viewed in the direction of rotation, the recesses 2 change stepwise and extend to the outer peripheral surface 7d.

By the way, each recess 2 is formed so that its depth ΔH has a maximum value set at 1.5 mm or smaller from the outer peripheral surface 7d of the mixing head 7. This value has been determined by experience and experiments, and the setting of such a depth makes it possible to maintain the mixing head 7 in a good rotating state under any conditions.

Figure 5:
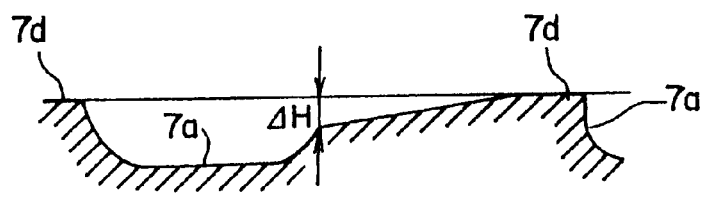
FIG. 5 is a schematic cross-sectional view depicting a modification of the plasticating screw according to the first embodiment of the present invention, and corresponds to FIG. 4.

The recesses 3 are constructed like the abovedescribed recesses 2. Further, the recesses 2,3 are not limited in cross-sectional shape to such a steplike shape as shown in FIG. 4, but may be formed as recesses in the shape of slopes so that, as is illustrated in FIG. 5, they extend gradually to the outer peripheral surface 7d. In this modification, it is also preferred to form each recess so that its depth ΔH has a maximum value set at 1.5 mm or smaller from the outer peripheral surface 7d of the mixing head 7.

As the plasticating screw according to the first embodiment of the present invention is constructed as described above, charging of a feed into an unillustrated feed hopper and subsequent rotation of the mixing head 7 cause the feed to enter the grooves 7b from the tapered portion 7e on the side of the rearward end of the mixing head 7, to move through the grooves 7a and further to move from the grooves 7a into the tapered portion 7c on the side of the forward end of the mixing head 7. As a result of such movement of the feed from the grooves 7a to the grooves 7b, the feed is subjected to shear force and dividing action so that good kneading and dispersion are performed.

On the other hand, a portion of the feed which has entered the grooves 7b is caused, under rotating force of the mixing head 7, to move into the recesses 3 and further onto the outer peripheral surface 7d located on rearward sides of the respective recesses 3 as viewed in the direction of rotation. Likewise, a portion of the feed which has entered the grooves 7a is fed, by rotating force of the mixing head 7, onto the outer peripheral surface 7d on the rearward side as viewed in the direction of rotation by way of the recess 2.

When the mixing head 7 rotates, a clearance between the cylinder and the mixing head 7 becomes gradually narrower in the order of each groove 7a or 7b, its downwardly adjacent recess 2 or 3, and the outer peripheral surface 7d so that the radius of rotation of the mixing head 7 relatively changes from a smaller radius to a greater radius.

As a consequence, lubricating pressure of the resin feed is produced between the unillustrated cylinder and the mixing head 7. This lubricating pressure acts evenly in the direction of a periphery of the mixing head 7 and owing to this lubricating pressure, the cylinder and the mixing head 7 are prevented from undergoing a metal-to-metal contact. Under various operating conditions, this also makes it possible to protect the cylinder and the mixing head 7 from damage and also to avoid deterioration of the resin under plastication.

Further, the setting of the maximum depth ΔH of the recesses 2,3 at 1.5 mm or smaller makes it possible to obtain necessary lubricating pressure under any conditions so that the mixing head 7 can be maintained in a good rotating state.

(b) Description of the Second Embodiment

Figure 6:
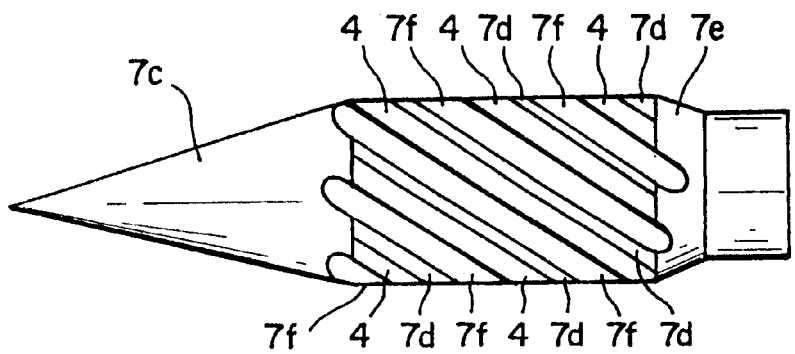
FIG. 6 is a view showing an external appearance of a mixing head in a plasticating screw according to a second embodiment of the present invention.
Figure 7:
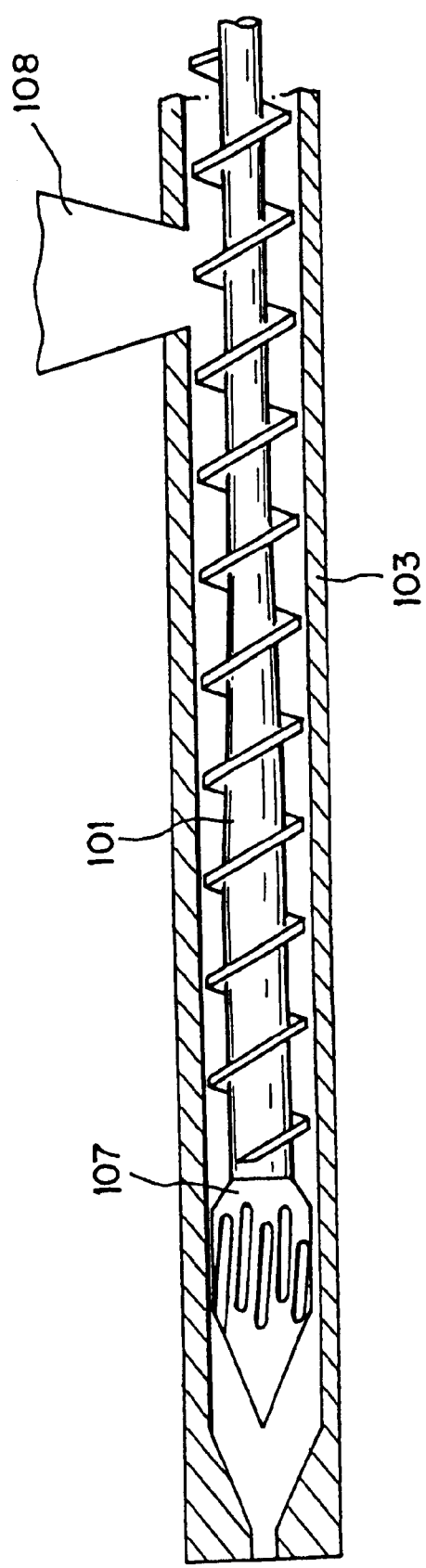
FIG. 7 through FIG. 14, all, are drawings for describing the conventional plasticating screws.

Referring next to FIG. 6, the second embodiment of the present invention will be described. In this second embodiment, grooves 7f are formed on a mixing head 7 in such a manner that the grooves 7f extend at both opposite ends thereof to tapered portions 7c,7e on forward and rearward sides of the mixing head 7, respectively.

Further, between the individual groove 7f,7f, recesses 4 are formed over the entire lengths of the corresponding grooves 7f. These recesses 4 are constructed like the above-described first embodiment and are in communicating with the forward grooves 7f as viewed in the direction of rotation. A rearward part of each recess 4 as viewed in the direction of rotation changes in the shape of steps or a slop and extends to an outer peripheral surface 7d. Further, each recess 4 is formed so that its depth ΔH has a maximum value set at 1.5 mm or smaller from the outer peripheral surface 7d of the mixing head 7.

As the plasticating screw according to the second embodiment of the present invention is constructed as described above, it acts in a similar manner as the above-described first embodiment and brings about similar effects as the first embodiment. Further, this second embodiment makes it possible to form each recess 4 sufficiently long in the direction of its length. The recesses 4 therefore can assure a similar recess area as the recesses 2,3 in the first embodiment even if their dimensions are small in their widthwise directions (in the direction of rotation of the mixing head 7). It is accordingly unnecessary to set the pitch of the grooves 7f at any significantly large value, thereby making it possible to minimize a reduction in the kneading performance of a resin feed.

Incidentally, the grooves 7f are formed at a predetermined angle relative to a central axis (not shown) of the mixing head 7 in FIG. 6. As an alternative, these grooves 7f may be formed in parallel with the central axis of the mixing head 7. Further, it is not absolutely necessary to form each recess 4 along the entire length of its corresponding groove 7f. The lengths and positions of these recesses may be changed as needed depending on various conditions such as operation conditions for the screw and properties of a resin.

(c) Other Modifications

The plasticating screw according to the present invention is not limited to the above-described embodiments, and can be modified in various ways to extent not departing from the spirit of the present invention. For example, the first embodiment and second embodiment were described with the mixing heads 7 arranged on the forward end portions of the unillustrated screws. These mixing heads 7 may each be arranged at another position of a screw such as an intermediate section thereof.

CAPABILITY OF EXPLOITATION IN INDUSTRY

As has been described above, the plasticating screw according to the present invention is useful as a screw for melting and kneading a solid feed, and is suitable for use especially in an injection molding machine or extruder which is adapted to inject a resin material such as plastics into a mold or to extrude the same subsequent to plastication.

What is claimed is:

1. A plasticating screw adapted to be rotatably mounted in a cylinder, comprising:
    a stem on and around which at least one spiral screw blade extends; and
    a mixing head projecting from one end of said stem, said mixing head having in its circumferential surface a plurality of groove portions each having a uniform width and extending spirally toward and terminating short of a tip of said mixing head, said groove portions being circumferentially spaced at equal distances, said mixing head having a forward end portion toward said tip and a rearward end portion toward said one end of said stem;
    said mixing head further having a plurality of recesses, each having a uniform width, which are disposed and arranged in an inter-groove region of the circumferential surface, said recesses communicating with at least some of said plural groove portions in such a manner that the individual recess joins to the associated groove portion at one side opposite to the direction of rotation of said mixing head, said at least some groove portions being circumferentially spaced at equal distances.

2. A plasticating screw according to claim 1, wherein each of said recesses is in the form of a step with respect to the associated groove portion.

3. A plasticating screw according to claim 1, wherein each of said recesses has a bottom sloping down to the associated groove portion.

4. A plasticating screw according to claim 1, wherein said recesses have a depth of at most 1.5 mm.

5. A plasticating screw according to claim 1, wherein said plural groove portions include:
    a number of first groove portions each extending at a front end thereof into a base of a forward end portion of said mixing head and extending toward and terminating at a back end thereof short of a rearward end portion of said mixing head, and
    a number of second groove portions each extending at a back end thereof into said rearward end portion of said mixing head and extending toward and terminating at a front end thereof short of said forward end portion of said mixing head,
    wherein said first and second groove portions are alternately arranged on said mixing head with their either front or back ends staggered.

6. A plasticating screw according to claim 5, wherein said recesses includes:
    a number of first recesses located in said forward end and communicating one with each of said first groove portions, and
    a number of second recesses located in said rearward end and communicating one with each of said second groove portions.

7. A plasticating screw according to claim 5, wherein said recesses (2,3) comprise:
    first recesses (2) arranged on said forward end portion of said mixing head (7), and
    second recesses (3) arranged on said rearward end portion of said mixing head (7),
    wherein said first recesses (2) are formed in communication with said first groove portions (7a) and said second recesses (3) are formed in communication with said second groove portions (7b).

8. A plasticating screw according to claim 1, wherein said at least some of said plural groove portions extend at opposite ends thereof into said forward end portion and said rearward end portion of said mixing head.

9. A plasticating screw according to claim 8 or 1, wherein said plural recesses are located one between each adjacent pair of said groove portions each said recess communicating with and extending along one of the respective adjacent pair of said groove portions through the entire length of said one groove portion.

10. A plasticating screw according to claim 8, wherein said recesses (4) are formed between said groove portions (7f,7f), respectively, and said recesses (4) are formed in communication with said groove portions (7f) located forward thereof as viewed in a direction of rotation over entire lengths of said groove portions (7f).

11. A plasticating screw adapted to be rotatably mounted in a cylinder, comprising:
    a stem on and around which at least one spiral screw blade extends; and
    a mixing head projecting from one end of said stem, said mixing head having in its circumferential surface a plurality of groove portions extending spirally toward and terminating short of a tip of said mixing head, said groove portions being circumferentially spaced at equal distances;
    said mixing head further having a plurality of recesses which are disposed and arranged in an inter-groove region of the circumferential surface and communicate with at least some of said plural groove portions in such a manner that the individual recess joins to the associated groove portion at one side opposite to the direction of rotation of said mixing head, said at least some groove portions being circumferentially spaced at equal distances wherein being said plural groove portions include:
a number of first groove portions each extending at a front end thereof into a base of a forward end portion of said mixing head and extending toward and terminating at a back end thereof short of a rearward end portion of said mixing head, and
a number of second groove portions each extending at a back end thereof into a rearward end portion of said mixing head and extending toward and terminating at a front end thereof short of said forward end portion of said mixing head,
wherein said first and second groove portions are alternately arranged on said mixing head with their either front or back ends staggered, and
wherein said recesses include:
a number of first recesses located in said forward end and communicating one with each of said first groove portions, and
a number of second recesses located in said rearward end and communicating one with each of said second groove portions.

12. The plasticating screw according to claim 11, wherein each of said recesses is in the form of a step with respect to the associated groove portion.

13. The plasticating screw according to claim 11, wherein each of said recesses has a bottom sloping down to the associated groove portion.

14. The plasticating screw according to claim 11, wherein said recesses have a depth of at most 1.5 mm.

15. The plasticating screw according to claim 11, wherein said plural groove portions include:
a number of first groove portions each extending at its front end into the base of a forward end portion of said mixing head and extending toward and terminating at its back end short of a rearward end portion of said mixing head, and
a number of second groove portions each extending at its back end into said rearward end portion of said mixing head and extending toward and terminating at its front end short of said forward end portion of said mixing head,
wherein said first and second groove portions are alternately arranged on said mixing head with their either front or back ends staggered.

16. The plasticating screw according to claim 11, wherein said at least some of said plural groove portions extend at opposite ends into forward and rearward end portions of said mixing head.

17. The plasticating screw according to claim 11, wherein said recesses comprise:
first recesses arranged on said forward end portion of said mixing head, and
second recesses arranged on said rearward end portion of said mixing head,
wherein said first recesses are formed in communication with said first groove portions and said second recesses are formed in communication with said second groove portions.

18. The plasticating screw according to claim 11, wherein said recesses are formed between said groove portions, respectively, and said recesses are formed in communication with said groove portions located forward thereof as viewed in a direction of rotation over entire lengths of said groove portions.

* * * * *